United States Patent

Ackerman et al.

[11] Patent Number: 5,963,734
[45] Date of Patent: Oct. 5, 1999

[54] METHOD AND APPARATUS FOR CONFIGURING AN INTELLIGENT ELECTRONIC DEVICE FOR USE IN SUPERVISORY CONTROL AND DATA ACQUISITION SYSTEM VERIFICATION

[75] Inventors: William J. Ackerman, Kutztown; Steven A. Kunsman, Allentown, both of Pa.

[73] Assignee: ABB Power T&D Company Inc., Raleigh, N.C.

[21] Appl. No.: 08/825,756

[22] Filed: Apr. 3, 1997

[51] Int. Cl.⁶ ........................................................ G06F 9/44
[52] U.S. Cl. ........................................ 395/500.39; 702/62
[58] Field of Search .................................... 364/578, 165; 370/466; 702/125, 60–62; 707/104; 455/507; 395/500

[56] References Cited

U.S. PATENT DOCUMENTS

| | | | |
|---|---|---|---|
| 3,662,219 | 5/1972 | Knox | 317/28 R |
| 3,668,474 | 6/1972 | Knox | 317/28 R |
| 3,956,601 | 5/1976 | Harris et al. | 179/175.3 R |
| 4,686,641 | 8/1987 | Evans | 364/580 |
| 4,728,885 | 3/1988 | DeSanto | 324/102 |
| 4,794,599 | 12/1988 | Purcell et al. | 371/20 |
| 4,891,743 | 1/1990 | May et al. | 363/87 |
| 5,079,715 | 1/1992 | Venkataraman et al. | 364/481 |
| 5,179,701 | 1/1993 | Chisholm | 707/104 |
| 5,396,416 | 3/1995 | Berkowitz et al. | 364/165 |
| 5,452,465 | 9/1995 | Geller et al. | 395/800 |
| 5,455,929 | 10/1995 | Bosshart et al. | 395/500 |
| 5,475,867 | 12/1995 | Blum | 455/507 |
| 5,490,134 | 2/1996 | Fernandes et al. | 370/466 |
| 5,552,984 | 9/1996 | Crandall et al. | 364/424.03 |
| 5,604,679 | 2/1997 | Slater | 702/125 |

FOREIGN PATENT DOCUMENTS

| | | |
|---|---|---|
| 59-141841 | 8/1984 | Japan . |
| 61-205050 | 9/1986 | Japan . |
| 64-849 | 1/1989 | Japan . |
| 3-268527 | 11/1991 | Japan . |
| 5-3591 | 1/1993 | Japan . |
| 6-54378 | 2/1994 | Japan . |
| 7-264766 | 10/1995 | Japan . |

*Primary Examiner*—Kevin J. Teska
*Assistant Examiner*—Dan Fiul
*Attorney, Agent, or Firm*—Woodcock Washburn Kurtz Mackiewicz & Norris LLP

[57] ABSTRACT

Method and apparatus for performing point to point verification of devices in a SCADA system are provided. An intelligent electronic device (IED), having two modes of operation—normal and simulation—provides simulated IED data to a SCADA device on command. The IED is capable of continuing to perform its normal functions of monitoring a process under control during the simulation mode. The IED accepts simulation data either locally through a user interface or from a SCADA device over/ through a communication port. The simulation data is then stored in a memory area of the IED. During simulation mode, the IED does not update the memory area but rather provides data from this area to a SCADA device on command.

20 Claims, 6 Drawing Sheets

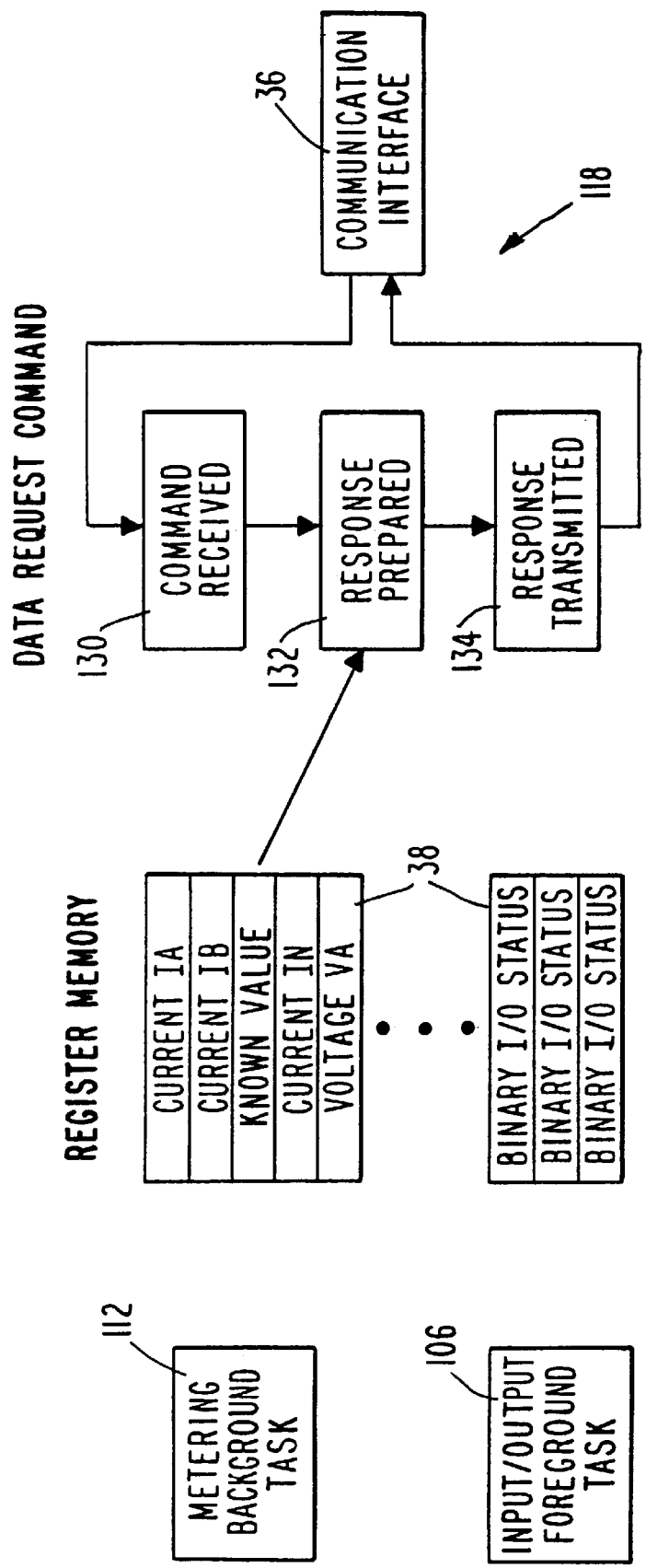

METHOD AND APPARATUS FOR CONFIGURING AN INTELLIGENT ELECTRONIC DEVICE FOR USE IN SUPERVISORY CONTROL AND DATA ACQUISITION SYSTEM VERIFICATION

FIELD OF THE INVENTION

The invention relates to Supervisory Control and Data Acquisition (SCADA) systems generally. More particularly, the invention relates to method and apparatus for use in the verification of a SCADA system including an Intelligent Electronic Device (IED) configured to provide a SCADA device with verification data.

BACKGROUND OF THE INVENTION

A vital part of any process control system is the initial and periodic point-to-point verification of the system, including the process input values, the database, the displays and the like. Such a verification procedure is associated with a SCADA system, which in its most generic definition is essentially a process control system. The components of SCADA system comprise a SCADA device and one or more remotely connected IEDs. As used herein, the term SCADA device is used as a convenient shorthand for what may be a collection of electronic equipment, including a computer based controller, that is used to remotely monitor and/or control the operation of one or more remote IEDs such as relays, meters, transducers and the like. In general, the SCADA device is located miles away from the IEDs presenting many SCADA system verification difficulties. However, such a definition should not preclude a SCADA device located much closer, even in the same plant as the IED or IEDs.

A complete point-to-point verification of a SCADA system is very time and labor intensive. The verification is particularly time and labor intensive where the IED is in an extremely remote location with respect to the SCADA device. In such a case, transportation and communication problems abound. Therefore, reducing the time and effort required to perform a point-to-point verification of a SCADA system while insuring that the SCADA device database and overall SCADA system operation meets the highest possible accuracy standards would provide substantial cost advantages over current verification procedures.

An essential element of installing and periodically verifying the operation of a SCADA system is the point-to-point verification of the interaction between the IED and the SCADA device. In the simplest form of a point-to-point verification, a known quantity (e.g., an analog value or its equivalent or a status value, which can comprise one or more binary bits) is injected into the measuring input of the IED. Thereafter, the injected quantity is verified by comparing the value obtained on all user displays, databases, and process programs to the expected, injected value. In a more complex verification, the injected value is varied so as to exceed defined alarm limits, thereby verifying that the correct alarm and event messages are generated by the program(s) receiving the value.

An accurate and reliable point-to-point verification requires the value injected into the IED input circuit to be highly stable and determinable so that the value can be accurately traced through the control chain to its end location (i.e., at a SCADA device). For example, consider a simple current metering circuit in an electric power system:

1. A stable and accurate 60 Hz current is caused to flow on the phase wire being measured.
2. The output of the current transformer connected to the phase wire is then measured and checked to verify that it is scaled by the CT turns ratio and that the phasing is correct.
3. The output of the transducer connected to the CT is measured and checked to verify that the milliamp DC signal is proportional to the 60 Hz current by the specified scale factor.
4. The output of an analog-to-digital converter connected to the transducer is checked to verify that it is producing a correct digital representation of the known 60 Hz current.
5. The output of the alarm and event processing software that is logically connected to the A/D converter is checked to verify that it is producing the value of the 60 Hz current in the appropriate numerical form.
6. All graphic and tabular displays that include the 60 Hz current are checked to verify that the proper value is presented in the correct location on the display.
7. The 60 Hz current is varied to insure that the dynamic changes in the value are correctly transmitted to the end display or database.

Many point-to-point verification procedures bypass the first two steps listed above. Primarily, this bypass is acceptable because it is difficult to maintain a highly stable and accurate input signal, particularly where the pre-transformation signal is a high value (as in the case of a high-voltage power line), and also because it is likely that the current and voltage transformers (or other primary transformation devices) have been checked and calibrated by some other means. In an electric power system, for example, the transformers are verified at the time of initial installation and commissioning.

Although various steps can be eliminated from the verification procedure, an essential part of point-to-point verification is the ability to inject or trigger a single quantity as part of the process. This ability to transmit a single quantity is commonly referred to as the "single quantity" concept. This insures that only a single data point needs verification. Moreover, restricting the injection to a single quantity eliminates any possible ambiguity that could result if multiple responses are observed. Typical IEDs, such as microprocessor-based relays used in electric power systems, are complex devices that can have thousands of database values. Many, or all, of these values may be transmitted to a controlling device, such as a SCADA device, for further processing and/or display to users. Performing a point-to-point verification of a SCADA system involving these relays can be very difficult because of the complex interaction between the measured values and the resulting functions performed by the relay. For example, injecting a current greater than a specified value may cause the relay to operate, sending a signal to its associated circuit breaker. Such an event will cause two or more indications: (1) a digital representation of the current value, and (2) a status change representing the signal sent to the controlled circuit breaker. This violates the single quantity concept because the injection of a single quantity will require the tracing of multiple quantities through the system.

Violating the single quantity concept greatly complicates verification. For example, in a relay verification, the operator performing the verification must verify that all alarms and messages relating to both events are generated and processed properly. This would not be too difficult if only two quantities are generated, but in reality, a single input current can result in additional indications like target information, fault records, operation records, and the like. Additionally, as more IEDs are added to the system, the problem is compounded.

In addition to the requirement for single-quantity verification, most procedures for doing a point-to-point verification require the following:

1. Assembling and transporting to the IED location a collection of complex and expensive test equipment and signal generators that are required to produce the injected signals.
2. A technician at the remote location to inject the single quantity into the IED's analog inputs.
3. A technician at the central location(s) to verify the correct processing and display of the injected quantity.
4. Disabling or disconnecting the IED from the process so that the proper signals can be injected without interference to the process; or without actually causing process control changes (breaker operations) to occur.

Such a verification system presents many drawbacks. For example, two technicians at disparate locations are required to perform the verification. One of the technicians may be required to travel long distances. Moreover, the IED must be disconnected from the process that it is monitoring and/or controlling, which may affect the process under control.

The applicants have recognized that there is a need for method and apparatus that address the shortcomings of present verification systems by reducing the burden of verifying aspects of the operation of a SCADA system.

SUMMARY OF THE INVENTION

The present invention provides a system and a method for verifying the functionality of a supervisory control and data acquisition (SCADA) system. The SCADA system comprises a SCADA device, an intelligent electronic device (IED) and a communication link therebetween. Generally, the IED measures a physical process and stores digital data representative of the measurement in a memory area for transmission via the communication link to the SCADA device. When verification of the SCADA system is performed, a verification enable command may be communicated from the SCADA device to the IED via the communication link such that a verification mode is enabled in the IED. Alternatively, a verification enable command may be entered locally into the IED. Thereafter, the SCADA device or local input device communicates simulated digital data representative of measurement to the IED for storage in the IED. When the SCADA device requests IED data, the IED transmits the simulated digital data back from the IED to the SCADA device in place of actual digital data representative of the measurement.

The IED used in the simulation process described above comprises an analog-to-digital converter (ADC) for measuring the physical process and converting the measurements into a digital representation of the measured values, a memory area for storing digital values and a processor, which is connected to the ADC and the memory area. The processor operates upon the digital representation values according to a predetermined function and selectively moves digital values to the memory area. Additionally, the IED contains a command register for storing verification enable commands that is accessible by the processor such that the processor does not move measured digital values to the memory area when the command register contains a verification enable command. During this time, the IED would provide digital values from its memory area. An output port provides a communication mechanism with the SCADA device for transmitting the digital values from the memory area to said SCADA device. An input port selectively receives substitute (i.e., simulated) digital values from the SCADA device or local input device for storage in the memory area such that the processor transmits the substituted digital values to the SCADA device instead of measured digital values. The input and output ports could be provided as a single input/output port.

The IED can be either a relay, an electronic meter or a transducer. And importantly, the IED can continue measuring the physical process during the verification enable mode. Thus, the verification can continue while the process under control is being monitored and controlled.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed.

In the drawings.

DETAILED DESCRIPTION OF A PREFERRED EMBODIMENT

According to a presently preferred embodiment, a system and method for verifying the functionality of a SCADA system will now be described with reference to the Figures. It will be appreciated by those of ordinary skill in the art that the description given herein with respect to those Figures is for exemplary purposes only and is not intended in any way to limit the scope of the invention. For example, an IED is described herein with reference to a microprocessor-based relay; however, the microprocessor-based relay is merely for the purpose of clearly describing the present invention and in not intended as a limitation. The IED could be, for example, a microprocessor-based meter. The methods described herein could be provided as a software package that operates directly on the IED or SCADA device.

Figure 1:
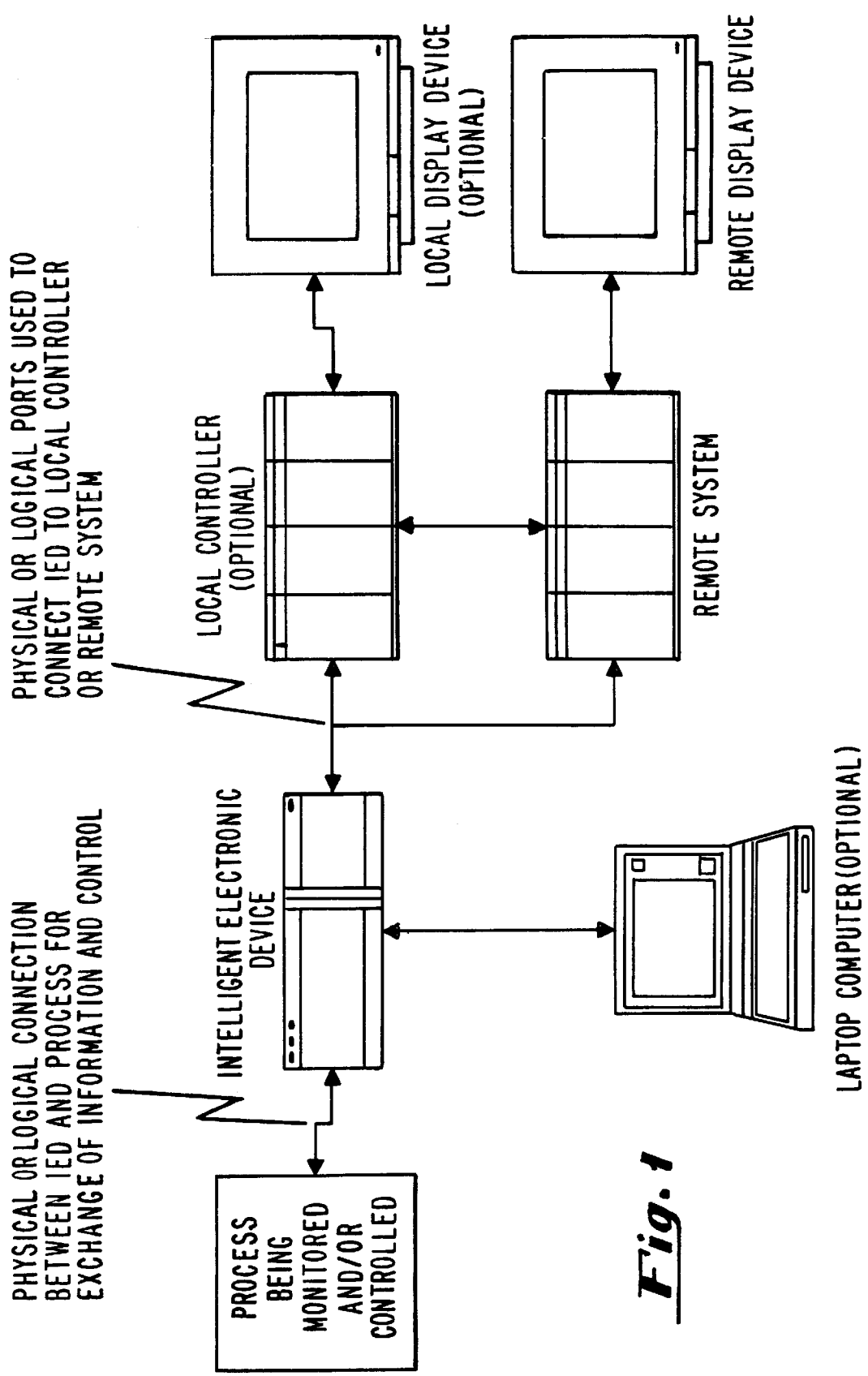
FIG. 1 is a block diagram of an exemplary Supervisory Control and Data Acquisition system in accordance with the present invention.

Referring now to FIG. 1, there is shown a SCADA system 10 of the present invention. As shown, the system comprises a SCADA device 16 such as an EMSYS or S.P.I.D.E.R. System manufactured by ABB, which has a display device 22 for displaying data to a human operator (not shown), a second SCADA device 14 (optionally be connected to the system), which may have a display device 18 connected thereto, an IED 20 such as a microprocessor-based relay, which monitors and/or controls a physical process 12, and an optional local computer 24 for configuring IED 20 locally. IED 20 communicates with SCADA devices 14 and 16 via communication link 26. Communication link 26 can be one of many well-known communication links such as RS-232, Ethernet and the like.

As described in further detail below, SCADA system 10 requires point-to-point verification of IED 20 and SCADA device 16 (or optionally 14). The point-to-point verification operates by way of simulated data points provided by IED 20 to SCADA device 16 in place of actual data as measured from the process under control 12. In this way, the operation of SCADA system 10 can be simulated without the need for an operator or expensive test equipment to inject a test signal into system 10. Moreover, IED 20 can continue to monitor and/or control process 12.

Figure 2:
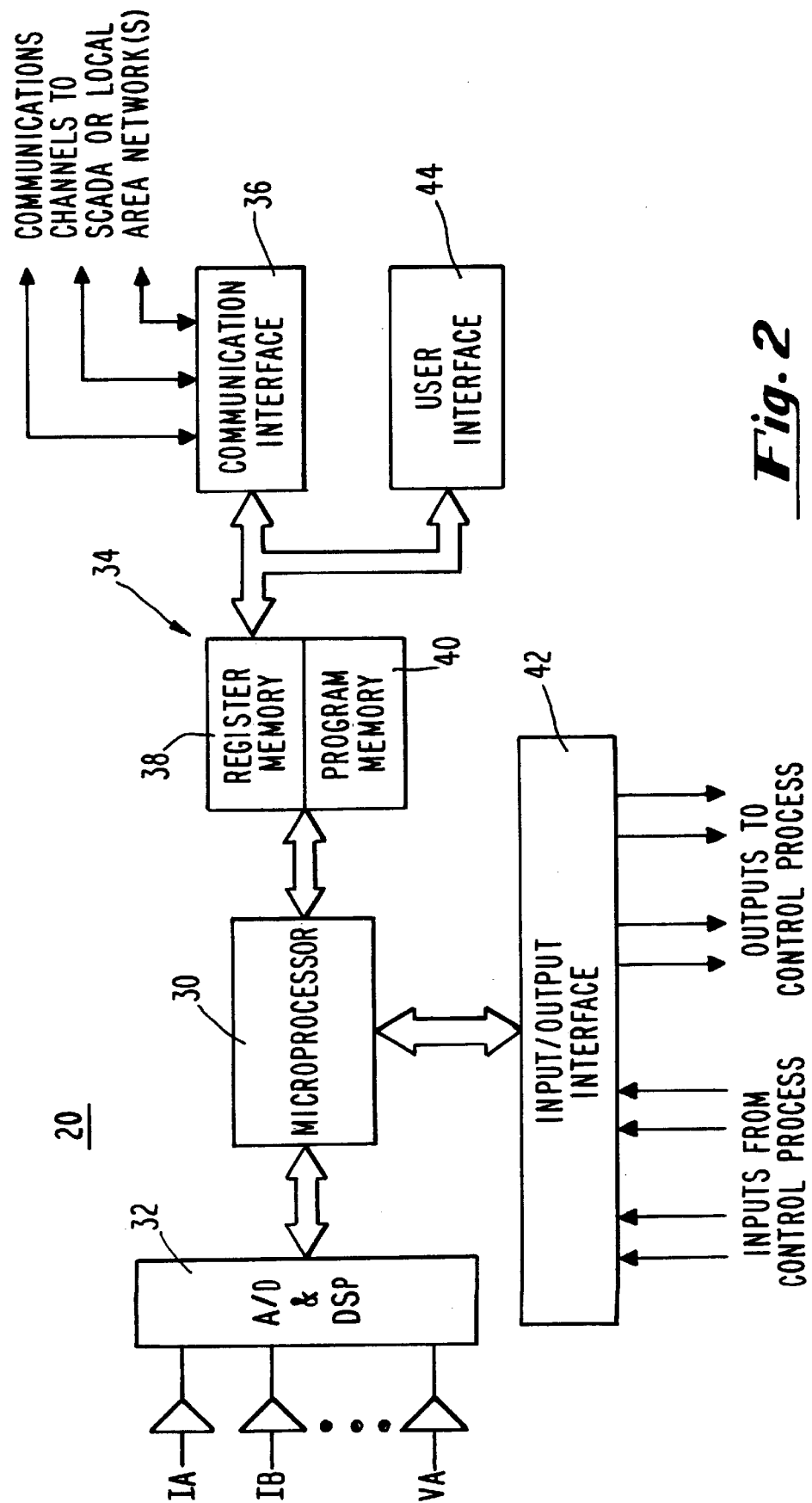
FIG. 2 is a block diagram of an exemplary Intelligent Electronic Device in accordance with the present invention.

In order to provide simulated data to SCADA system 10, IED 20 is employed. Referring to FIG. 2, an exemplary IED 20 is shown in further detail. As shown, the essential parts of IED 20 comprise a microprocessor 30, an analog-to-digital converter (ADC) and digital signal processor 32, a communication interface 36, an input/output interface 42, a user interface 44 and a memory area 34. Memory area 34 comprises both Read-Only Memory (ROM) and Random Access Memory (RAM) and comprises both a program memory 40 and a communication port register memory 38, which includes a command register. The simulation function of IED 20 is provided by a software program stored in memory area 34.

As with many standard IEDs such as the microprocessor-based relay, IED 20 measures aspects of a physical process 12 such as currents and voltages (e.g., $I_A$, $I_B$ and $V_A$) and converts the measured values into a digital equivalent via ADC and digital signal processor 32. Microprocessor 30 moves the digital representation of the measured values into memory area 34 where the data can be accessed by programs and external devices such as a SCADA device (e.g., 14 and 16). Moreover, microprocessor 30 can perform various predetermined functions on the data, such as fault detection as in the case of a relay, or control the process. Microprocessor 30 is also in communication with communication interface 36 so that data (i.e., digital representative data) can be transferred to an external device such as SCADA devices 14 and 16. Additionally, communication interface 36 allows an external device such as local computer 24 or SCADA devices 14 and 16 to provided commands and data to IED 20. Input/output interface 42 is coupled to microprocessor 30 and provides binary input signals from a controlling device (not shown) such as a circuit breaker. Moreover, IED 20 provides control signals to the controlling device such as a breaker close or open signal. User interface 44 provides a local mechanism for gaining access to the data in register memory 38. In this way, a local operator can provide simulation data to IED 20 or check the status of data within register memory 38.

The simulation function is provided by commanding IED 20 to enter a simulation mode. There are many ways in which this command can be communicated to IED 20. For example, IED 20 could be locally commanded to enter simulation mode via user interface 44 or the command can be sent via communication interface 36. In the latter case, the command would likely, but not necessarily, come from SCADA device 14 or 16.

Figure 3:
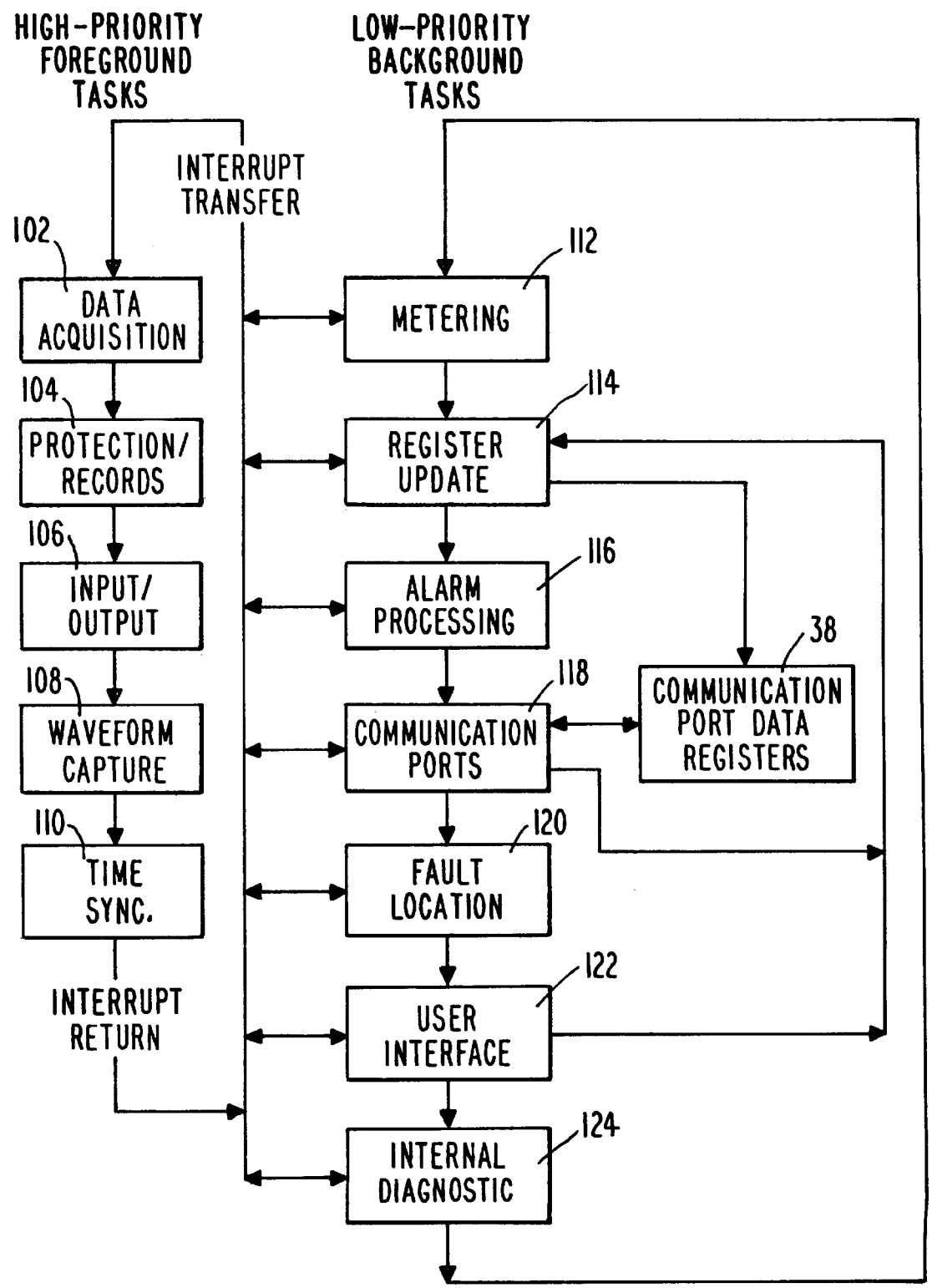
FIG. 3 is a flow chart of the process within the exemplary Intelligent Electronic Device including the performing of a point-to-point test function in accordance with the present invention.

FIG. 3 provides an exemplary conceptual task diagram of IED 20 according to the current invention. The task diagram shown is generally of the type employed in a microprocessor-based relay. Those of ordinary skill in the art will recognize that the task diagram for other types of IEDs may vary from the task diagram of FIG. 3. For example, fault location task 120 would likely not be implemented on a microprocessor-based meter, but would be replaced by some other meter specific task. Essentially, the tasks of FIG. 3 are divided between high-priority and low-priority tasks. As with many microprocessor-based devices, the high-priority tasks must be completed in real-time; whereas, the low-priority task are not as time critical. The tasks are shown in an exemplary order in which they might execute on IED 20; however, the order of the tasks may change depending on design choices and the order of interrupts received.

The high-priority tasks shown would generally be present in all IEDs; however, as discussed above, the actual function provided by each task may vary somewhat among IEDs depending on the particular application. The primary high-priority task is data acquisition task 102 which provides the raw digital data representative of the measured process to the entire IED 20. Data acquisition task 102 interfaces with ADC 32 to acquire digital data representation of the process under control 12. The digital data is then provided to other tasks for processing.

Generally, protection/records task 104 executes next, interfacing with data acquisition task 102 to examine the digital data obtained from the process under control 12. Protection/records task 104 determines if there is an abnormal condition present in the process under control that requires immediate attention. For example, a microprocessor-based relay must determine a fault condition and immediately take steps to protect the line. Additionally, if there is an abnormal condition, or some other predetermined external event, the digital data is collected and stored in a record for later use by background processes.

Next, input/output task 106 measures the state of a controlling device via a set of primarily binary inputs, such as a circuit breaker state, as measured by input/output interface 42. Input/output task 106 also signals the controlling device via input/output interface 42 by outputting a signal to it such as open or close circuit breaker.

Waveform capture task 108, also interfaced with data acquisition task 102, saves a portion of the collected digital data as a waveform when an abnormal condition is detected. The waveform is then available for later use by background processes.

Finally, time synchronization task 110 controls the timing of IED 20 such that all of the IEDs in a particular network (i.e. SCADA system) are synchronized to the same time base. This synchronization is typically done through an external time synchronization device (not shown).

The background tasks shown in FIG. 3 are also typically included in IED 20. Although, the exact task function may vary depending on application specific needs. Describing the background tasks in descending order, metering task 112 interfaces with data acquisition task 102 to average the digital data values measured over a period of time from the process under control.

Thereafter, register update task 114 interfaces with metering module 112 and input/output module 106 to store a variety of data items (e.g., digital data values, binary input values and so on) into a memory area for later delivery to SCADA device 14, 16. Moreover, as is described in further detail below, during IED simulation mode, register update task is temporarily removed from the task list to prevent it from storing values in communication port data registers 38.

Next, alarm processing task 116 examines the averaged data produced by metering task 112 to determine alarm conditions. If an alarm condition is detected (e.g., a voltage exceeds a predefined limit) then an indication of the condition is provided through a user selected mechanism, e.g., an output to SCADA device 10 or a physical output such as a light or sound.

Communication port task 118 interfaces with the communication port data registers to transfer data to and from SCADA devices 14, 16 via communication interface 36. Communication port task 118 receives commands from the SCADA device to provide data or configure IED 20. Significantly, communication port task 118 receives a command from SCADA device 14, 16 to enter simulation mode. When communication port task 118 receives a simulation mode command, command port task 118 removes register update task 114 from the task list, preventing that task from putting data in communication port data registers 38. Generally, after register update task 114 is removed from the task list, communication port task 118 receives simulation data from SCADA device 14, 16. The simulation data is then stored in communication port data registers 38 for use during SCADA system verification. These registers can also be loaded with simulation data and commanded to enter simulation mode by another device such as local computer 24 or via another device connected remotely to IED 20. When communication port task 118 receive a command to enter normal IED mode, register update task 114 is restored to the list so that actual measured values are again stored in communication port registers 38. Importantly, while IED 20 is in simulation mode, the modules other than register update task 114 continue to function normally, i.e. monitoring and controlling the process under control 12. The only difference is that the measured data is not stored or available to the SCADA devices 14, 16.

Fault location task 120 is an example of an additional background tasks that could be performed by an IED that provides information about the process under control. In the fault location task example, the location of a fault on a high power line is determined, a function commonly performed by microprocessor-based relays. Fault location task 120 may also provide information to communication port data registers 38 for transfer and monitoring by SCADA devices 14, 16. Of course, when IED 20 is in simulation mode the fault location data would be replaced with simulated fault location data.

User interface task 122 provides input parameters to the IED via an input device such as a keyboard or a keypad on the front of the IED. Additionally, interface task 122 may display communication port data registers 38 or allow a user to change the values for the data stored in communication port data registers 120, when IED 20 is in simulation mode. Significantly, user interface task 122 provides another mechanism to command IED 20 into simulation mode. As with communication port task 118, when a user commands IED 20 into simulation mode via interface task 122, register update task 114 is removed from the task list. Until IED is again commanded to enter normal mode, register update task 114 will not store data in communication port data registers 38.

Finally, internal diagnostics task 124 determines the internal status of IED 20 such as memory failure or processor failure.

Figure 4:
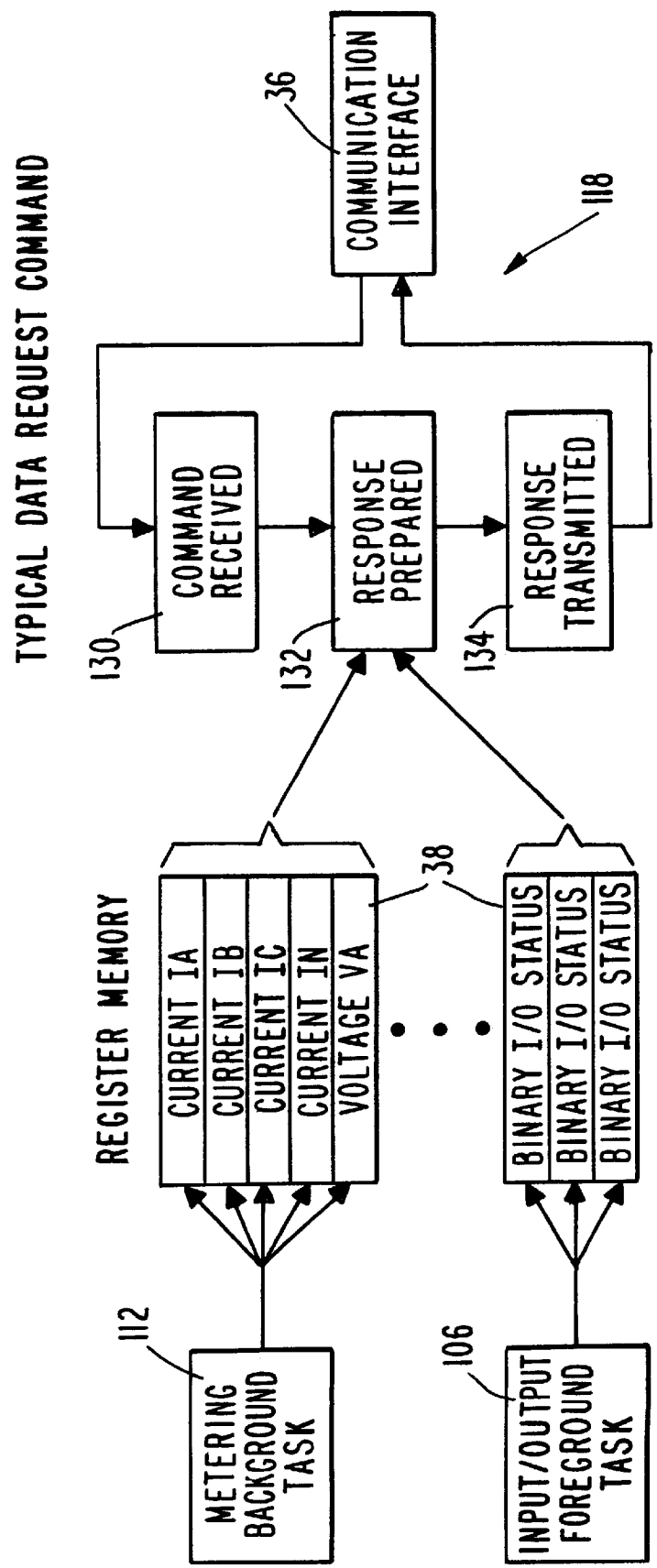
FIG. 4 is a flow chart of the interaction of software modules during a communication of measured values during normal mode Intelligent Electronic Device operation.

Referring now to FIG. 4, a flow chart is shown that depicts the interaction of the tasks that write values to register memory with the task that communicates with external devices. During normal operation, metering module 112 writes metered values to register memory 38, for example current $I_a$, current $I_b$, and so on. Moreover, input/output task 106 writes binary status values to register memory 38. The register memory values written by metering task 112 and input/output task 106 are then transmitted to SCADA device 16 (or another external device) for further processing. As described in above, communication port task 118 controls the interaction between IED 20 and SCADA device 16. FIG. 4 shows further details of communication port task 118 and its communication with SCADA device 10. For clarity and brevity, the communication process is described in reference to communication port task 118. However, similar steps to those shown in FIG. 4 for task 118 are also performed by user interface task 122 when communicating locally. During a typical communication sequence (i.e., normal mode) to communicate the values stored in register memory 38, three steps are performed. First, a command is received via communication interface 36 requesting the transmission of data values from register memory 38 (step 130). The data values are then retrieved from register memory 38, and prepared for transmission (step 132) by, for example, properly formatting the data. Finally, the prepared response is transferred to the external device (e.g., SCADA device 16) via communication interface 36 (step 134).

Figure 5:
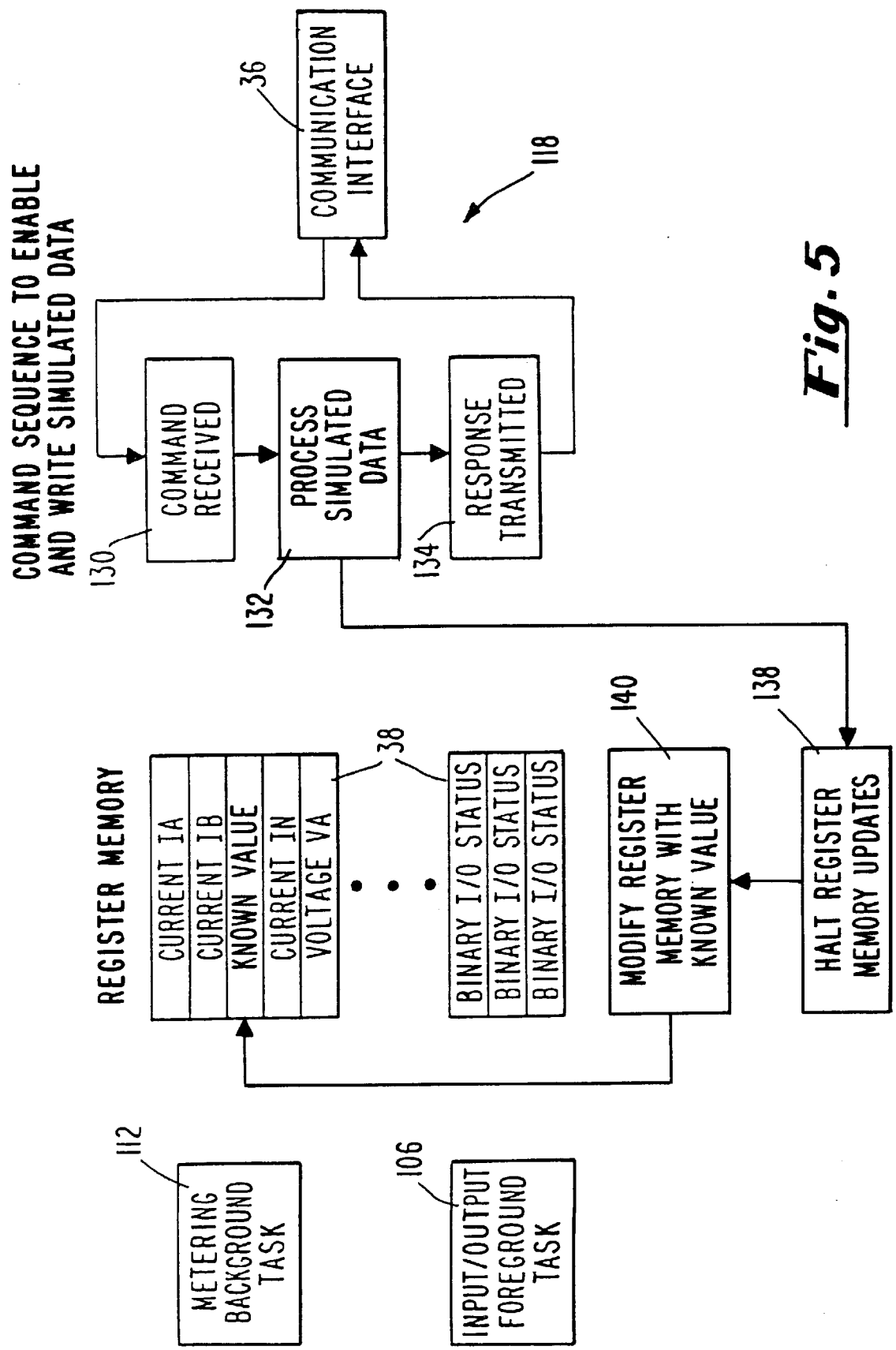
FIG. 5 is a flow chart of the modification of Intelligent Electronic Device memory during simulation mode; and, FIG. 6 is a flow chart of the output of a simulated value during simulation mode.
Figure 1:
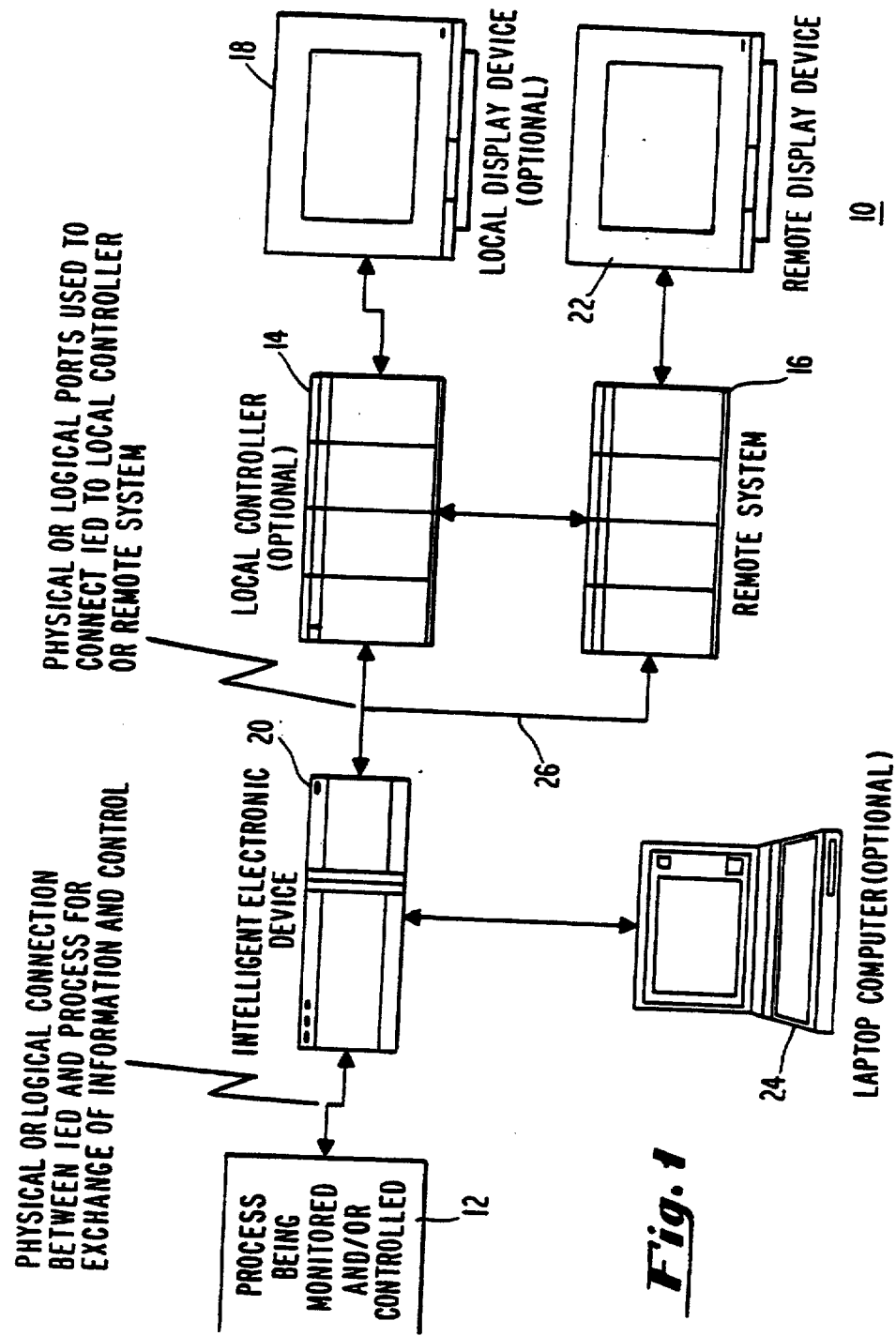
Figure 5:
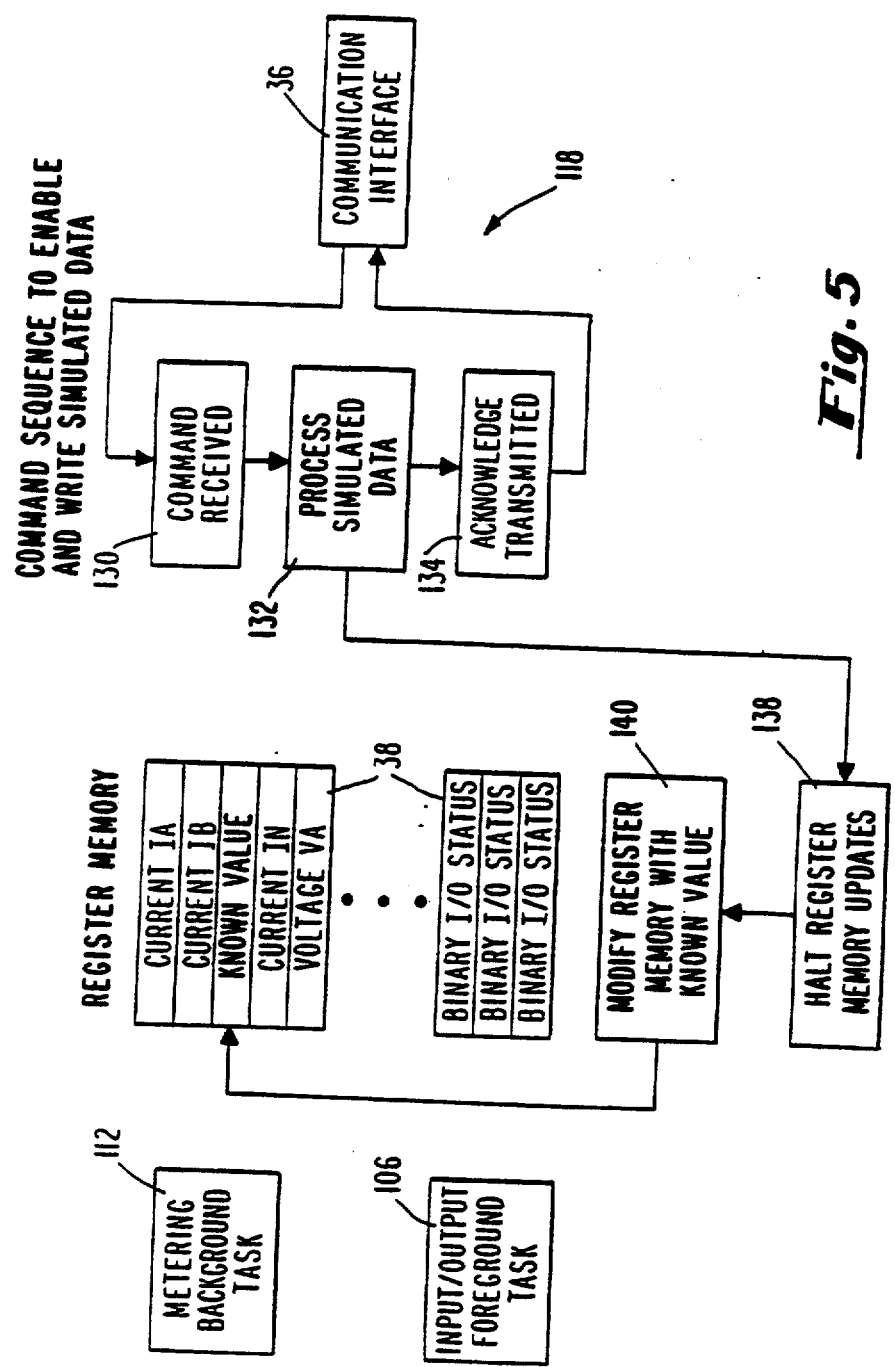

The steps required to perform point-to-point verification vary from those depicted in FIG. 4. Referring now to FIG. 5, a flow chart is depicted showing the process for modifying register memory 38 with a simulated value during point-to-point verification. Notice that here metering task 112 and input/output task 106 no longer change the values in register memory 38. Although, in all other respects IED 20 continues monitoring and/or controlling the process under control.

The communication is initiated when a command is received by IED 20 via communication interface 36 (step 130). The command will most likely originate from SCADA device 16 but can originate locally as well. Next, the command is processed, placing the simulated value received into register memory 38 (step 132). During this time, register update module 114 is removed from the task list, thereby preventing metering task 112 and input/output task 106 from further modifying register memory 38 (step 138). Register memory 38 is then modified with the value received via communication interface 36 (step 140). Finally, a verification is provided to SCADA device 16 that the command was processed successfully.

Referring to FIG. 6, a flow chart is shown depicting the transmission of the simulated register memory value from IED 20 to an external device (e.g., SCADA device 16). Notice that metering task 112 and input/output task 106 are not modifying register memory 38 while IED 20 is in the simulation mode. These modules are prevented from modifying the register values during the point-to-point testing procedure. In other respects, the flow of FIG. 6 resembles the flow of FIG. 4 in that the transmission of values from register memory is nearly identical in normal and simulation modes.

The transmission of the register value begins when a command is received via communication interface 36 and processed to determine that the request is made for a register memory value (step 130). Next, a response is prepared by retrieving the requested simulation value from register memory 38 (step 132). Finally, the register memory value is properly formatted for transmission to the external device (e.g., SCADA device 16)(step 134).

The above description of preferred embodiments is not intended to impliedly limit the scope of protection of the following claims. Thus, for example, except where they are expressly so limited, the following claims are not limited to a method wherein the simulation data is transferred to the IED. The simulation data could be stored locally in memory, on magnetic disk, magnetic tape or the like. Moreover, the claims are not limited to a method of entering simulation mode by removing the register update module from the task list. Other methods could be equally effective. For example, The register update module could itself recognize the IED mode and withhold from storing data in the registers.

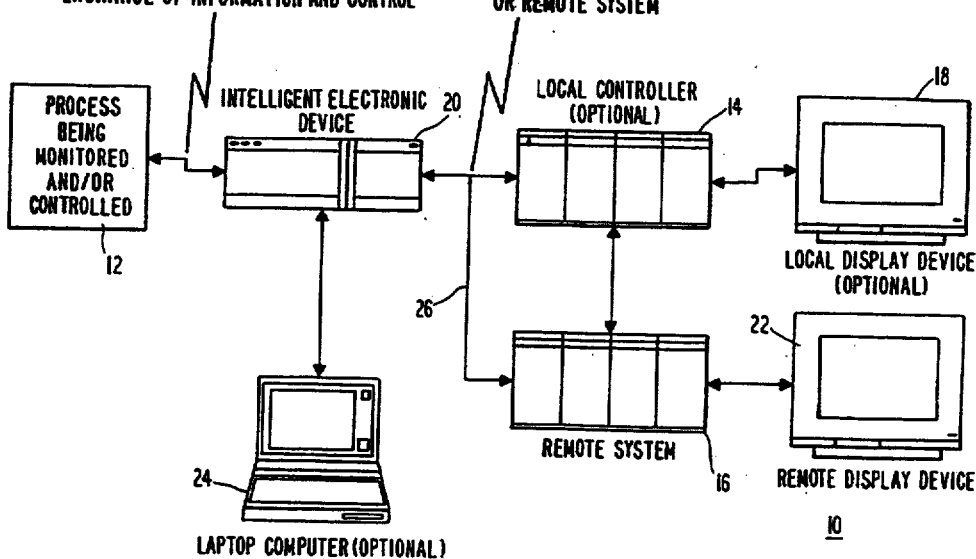

What is claimed is:

1. A method for verifying the functionality of a supervisory control and data acquisition (SCADA) system, the SCADA system comprising a SCADA device, an intelligent electronic device (IED) and a communication link therebetween, wherein the IED measures a physical process and stores digital data representative of the measurement in a memory area for transmission via the communication link to the SCADA device, the method comprising the steps of:

a) communicating a verification enable command from the SCADA device to the IED via the communication link such that a verification mode is enabled in said IED;

b) communicating simulated digital data representative of measurement data from one of the SCADA device and a local input device to the IED for storage in said IED;

c) transmitting said simulated digital data back from the IED to one of the SCADA device and a local input device in place of actual digital data representative of the measurement.

2. The method according to claim 1 wherein the SCADA system functionality is verified without the use of primary signal injection equipment.

3. The method according to claim 1, wherein said IED comprises:

an analog-to-digital converter (ADC) for measuring the physical process and converting the measurements into a digital representation of the measured values;

a memory area for storing digital values;

at least one processor in electrical communication with said ADC and said memory area, said processor operating upon said digital representation values according to a predetermined function, and said processor selectively moving said digital values to said memory area;

a command register for storing verification enable commands, said command register being in electrical communication with said processor such that said processor does not move said digital values to said memory area when the command register contains a verification enable command;

an output port in electrical communication with the SCADA device for transmitting said digital values from said memory area to said SCADA device;

and an input port for selectively receiving substitute digital values from the SCADA device for storage in said memory area such that said processor transmits said substitute digital values to the SCADA device instead of said measured digital values.

4. The method according to claim 3 wherein said input and output ports comprise a single input/output port.

5. The method according to claim 3 wherein said IED comprises one of a relay, an electronic meter and a transducer.

6. The method according to claim 1 wherein said IED continues measuring said physical process.

7. The method according to claim 6 wherein said IED continues controlling said physical process.

8. An intelligent electronic device (IED) for use with a supervisory control and data acquisition (SCADA) device, the IED comprising:

conversion means for measuring a physical process and converting the measurements into digital representation values of the measurement;

memory for storing digital values;

processor means in communication with said conversion means for operating upon said digital representation values according to a predetermined function;

said processor further being in communication with said memory for storing the digital representation values;

first communication means in communication with said memory and said SCADA device for selectively transferring said digital representation values to the SCADA device;

second communication means in communication with said memory and one of said SCADA device and another external device for storing simulated digital representation values into said memory in place of the measured digital representation values such that said simulated digital representation values are transferred to said SCADA device in place of the measured digital representation values.

9. The IED as recited in claim 8 wherein said first and second communication means comprise a single input/output port.

10. The IED as recited in claim 8 wherein said conversion means comprises an analog-to-digital converter.

11. The IED as recited in claim 8 further comprising a command register in communication with said second communication means and said processor means such that a first predetermined value stored in said command register indicates to said processor not to store digital representative values of the measurements.

12. The IED as recited in claim 8 wherein said IED comprises one of a relay, an electronic meter and a transducer.

13. An intelligent electronic device (IED) for use with a supervisory control and data acquisition (SCADA) device, the IED comprising:

an analog-to-digital converter (ADC) for measuring a physical process and converting said measurements to a digital representation of said measurement values;

a memory area capable of storing digital values;

at least one processor in electrical communication with said ADC and said memory area, said processor operating upon said digital representation values according to a predetermined function, and said processor selectively moving said digital values to said memory area;

a command register in electrical communication with said processor such that said processor does not move said digital values to said memory area when the command register contains a predetermined command instruction;

an output port in electrical communication with the SCADA device for transmitting said digital values from said memory area to said SCADA device;

and an input port for selectively receiving substitute digital values from one of the SCADA or another device for storage in said memory area such that said processor transmits said substitute digital values to said SCADA instead of said measured digital values.

14. The IED according to claim 13 wherein said input and output ports comprise a single input/output port.

15. The IED according to claim 13 wherein said IED comprises one of a relay, an electronic meter and a transducer.

16. The IED according to claim 13 wherein said IED continues measuring said physical process.

17. The IED according to claim 16 wherein said IED continues controlling said physical process.

18. A method for providing verification data for use with a supervisory control and data acquisition (SCADA) device from an intelligent electronic device (IED), comprising the steps of:

when said IED is in a first mode:
  measuring a physical process to obtain measured values;
  operating upon said physical process as required by said IED functionality;
  storing said measured values in a memory area for later transmission to the SCADA device;
  retrieving said measured values from said memory area and transmitting said measured values to the SCADA device;

when said IED is in a second mode:
  receiving simulated measured values and storing said values in said memory area in place of said measured values;
  continue measuring the physical process to obtain measured values;
  operating upon said measured values as required by said IED functionality;
  discontinuing the storage of said measured values in said memory area; and,
  retrieving said simulated measured values from said memory area and transmitting said simulated measured values to the SCADA device.

19. The method according to claim 18 wherein said IED comprises one of a relay, an electronic meter and a transducer.

20. The method according to claim 18 further comprising the step of receiving a command to enter one of the first or the second mode.

* * * * *

UNITED STATES PATENT AND TRADEMARK OFFICE
CERTIFICATE OF CORRECTION

PATENT NO. : 5,963,734
DATED : October 5, 1999
INVENTOR(S) : William J. Ackerman, Steven A. Kunsman It is certified that error appears in the above-identified patent and that said Letters Patent is hereby corrected as shown below:

The title page, showing the illustrative figure, should be deleted to appear as per the attached title page.

The drawing sheets, consisting of Figs. 1 and 5, should be deleted to be replaced with the Drawing Sheets, consisting of Figs. 1 and 5, as shown on the attached page.

Signed and Sealed this

Twenty-fifth Day of April, 2000

Attest:

Q. TODD DICKINSON

*Attesting Officer*  *Director of Patents and Trademarks*

United States Patent

Ackerman et al.

Patent Number: 5,963,734
Date of Patent: Oct. 5, 1999

[54] METHOD AND APPARATUS FOR CONFIGURING AN INTELLIGENT ELECTRONIC DEVICE FOR USE IN SUPERVISORY CONTROL AND DATA ACQUISITION SYSTEM VERIFICATION

[75] Inventors: William J. Ackerman, Kutztown; Steven A. Kunsman, Allentown, both of Pa.

[73] Assignee: ABB Power T&D Company Inc., Raleigh, N.C.

[21] Appl. No.: 08/825,756

[22] Filed: Apr. 3, 1997

[51] Int. Cl.[6] ............................................. G06F 9/44
[52] U.S. Cl. ......................................... 395/500.39; 702/62
[58] Field of Search ..................... 364/578, 165; 370/466; 702/125, 60–62; 707/104; 455/507; 395/500

[56] References Cited

U.S. PATENT DOCUMENTS

| | | |
|---|---|---|
| 3,662,219 | 5/1972 | Knox ......................... 317/28 R |
| 3,668,474 | 6/1972 | Knox ......................... 317/28 R |
| 3,956,601 | 5/1976 | Harris et al. ............. 179/175.3 R |
| 4,686,641 | 8/1987 | Evans ......................... 364/580 |
| 4,728,885 | 3/1988 | DeSanto ..................... 324/102 |
| 4,794,599 | 12/1988 | Purcell et al. .............. 371/20 |
| 4,891,743 | 1/1990 | May et al. .................. 363/87 |
| 5,079,715 | 1/1992 | Venkataraman et al. ... 364/481 |
| 5,179,701 | 1/1993 | Chisholm ................... 707/104 |
| 5,396,416 | 3/1995 | Berkowitz et al. ......... 364/165 |
| 5,452,465 | 9/1995 | Geller et al. ............... 395/800 |
| 5,455,929 | 10/1995 | Bosshart et al. ........... 395/500 |
| 5,475,867 | 12/1995 | Blum .......................... 455/507 |
| 5,490,134 | 2/1996 | Fernandes et al. ......... 370/466 |
| 5,552,984 | 9/1996 | Crandall et al. ........ 364/424.03 |
| 5,604,679 | 2/1997 | Slater ........................ 702/125 |

FOREIGN PATENT DOCUMENTS

| | | |
|---|---|---|
| 59-141841 | 8/1984 | Japan. |
| 61-205050 | 9/1986 | Japan. |
| 64-849 | 1/1989 | Japan. |
| 3-268527 | 11/1991 | Japan. |
| 5-3591 | 1/1993 | Japan. |
| 6-54378 | 2/1994 | Japan. |
| 7-264766 | 10/1995 | Japan. |

Primary Examiner—Kevin J. Teska
Assistant Examiner—Dan Fiul
Attorney, Agent, or Firm—Woodcock Washburn Kurtz Mackiewicz & Norris LLP

[57] ABSTRACT

Method and apparatus for performing point to point verification of devices in a SCADA system are provided. An intelligent electronic device (IED), having two modes of operation—normal and simulation—provides simulated IED data to a SCADA device on command. The IED is capable of continuing to perform its normal functions of monitoring a process under control during the simulation mode. The IED accepts simulation data either locally through a user interface or from a SCADA device over/through a communication port. The simulation data is then stored in a memory area of the IED. During simulation mode, the IED does not update the memory area but rather provides data from this area to a SCADA device on command.

20 Claims, 6 Drawing Sheets